United States Patent
Thompson

(10) Patent No.: US 6,463,872 B1
(45) Date of Patent: Oct. 15, 2002

(54) LASER PHOTOCURING SYSTEM

(75) Inventor: Justin Thompson, Huntersville, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/540,906

(22) Filed: Mar. 31, 2000

(51) Int. Cl.⁷ .......................... C23C 14/00; C23C 25/00
(52) U.S. Cl. .......................... 118/50.1; 118/420; 65/392
(58) Field of Search .............................. 118/50.1, 420, 118/DIG. 18, 641, 58, 68; 65/392, 431; 250/493.1, 504 R; 427/163.1

(56) References Cited

U.S. PATENT DOCUMENTS

| | | | |
|---|---|---|---|
| 3,590,248 A | * | 6/1971 | Chatterton, Jr. ............ 250/199 |
| 4,812,150 A | * | 3/1989 | Scott ........................... 65/3.11 |
| 4,849,640 A | | 7/1989 | Kruishoop |
| 4,973,343 A | * | 11/1990 | Frazee, Jr. et al. ................ 65/1 |
| 4,987,044 A | | 1/1991 | Vassiliou |
| 5,092,264 A | | 3/1992 | Overton et al. |
| 5,154,861 A | | 10/1992 | McBrierty et al. |
| 5,393,371 A | * | 2/1995 | Chang et al. ............... 156/629 |
| 5,616,141 A | | 4/1997 | Cipolla |
| 5,756,165 A | | 5/1998 | Ali et al. |
| 5,807,519 A | | 9/1998 | Suzuki et al. |
| 5,825,041 A | * | 10/1998 | Belek et al. ................ 250/504 |
| 5,858,297 A | | 1/1999 | Ozawa et al. |
| 5,932,625 A | | 8/1999 | Watanabe et al. |
| 5,939,148 A | | 8/1999 | Imai et al. |
| 5,960,853 A | | 10/1999 | Sterett et al. |
| 6,065,965 A | * | 5/2000 | Rechmann .................... 433/29 |

FOREIGN PATENT DOCUMENTS

| | | |
|---|---|---|
| JP | 64-087536 | 3/1989 |

* cited by examiner

Primary Examiner—Richard Crispino
Assistant Examiner—Yewebdar T Tadesse
(74) Attorney, Agent, or Firm—Sughrue Mion, PLLC

(57) ABSTRACT

A system and a method for curing a coating applied to an optical fiber or optical fiber ribbon using a laser curing device which emits a plurality of laser beams, having a predetermined wavelength or wavelength range, that impinge on the fiber or ribbon at differing angles to provide a uniform cure. The system includes at least one laser for outputting a laser beam; a splitter for splitting the laser beam into a plurality of output beams; and reflector arrangement for reflecting the output beams such that the output beams are irradiated on the coating of the optical fiber from different angles. The reflector comprises a plurality of mirrors or, alternatively, a housing, which substantially surrounds the optical fiber where at least a portion of an inner surface of the housing is reflective. Alternatively, the reflector may be replaced with a bundle of UV-waveguides directing portions of the beam to the substrate at different angles and/or directions. The system may also include a second laser for outputting a second laser beam which impinges on the fiber, where the wavelength range of the second laser is in a range that is different from the wavelength range of the first laser.

16 Claims, 4 Drawing Sheets

LASER PHOTOCURING SYSTEM

BACKGROUND OF THE INVENTION

1. Field of the Invention

The present invention is directed to method and apparatus for curing a coating of an optical fiber, or optical fiber ribbon, using one or more lasers. More particularly, the invention is directed to a method and apparatus where a plurality of laser beams are irradiated on the fiber from different angles to provide a more uniform cure of the fiber coating.

2. Related Art

In the manufacture of an optical fiber, a glass preform rod which generally is manufactured in a separate process is moved into a furnace at a controlled rate with the rod positioned vertically. The furnace softens the preform so that the optical fiber is drawn from the molten end of the preform rod by a capstan located at the base of a draw tower.

Because the surface of the optical fiber is very susceptible to damage caused by abrasion, a coating must be applied to the optical fiber, after it is drawn, but before it comes into contact with any surface. Once the liquid coating is applied, the coating material must become solidified rapidly before the optical fiber reaches a capstan. This is generally accomplished by photocuring.

While a single coating is applied in some instances, typically, two coatings are applied including a primary coating and a secondary coating. The primary coating is applied directly to the glass fiber and, when cured, forms a soft, compliant material for cushioning the glass fiber so as to protect it by relieving stresses created when the fiber is bent, cabled or spooled. The secondary coating is applied over the primary coating and functions as a protective outer layer for preventing damage to the glass fiber during manufacturing and use.

After the coating material or materials have been applied to the moving optical fibers, the coating material or materials are cured, typically by exposure to ultraviolet radiation. In some coating systems, a primary coating material is applied and cured by subjecting it to ultraviolet energy prior to the application of the secondary coating material. An important consideration in the manufacturing optical fibers is to minimize the amount of heat in the fiber during the coating process. For example, it has been discovered that the modulus of the coating material on the optical fiber is a function of the temperature at which the curing of the coating material occurred. An undesired temperature can occur if an excessive amount of infrared radiation reaches the coating material which will have an adverse impact on the resulting modulus of the coating material.

Another consideration is that the fiber is already very hot itself as a result of the drawing process. If the fiber is too hot as it enters the fluid in the coating die a thermal boundary layer will form creating coating instability and/or allowing the coating to not coat the fiber at all. Adding heat from the lamps reduces the rate of cooling of the fiber thus increasing the chances of this occurring—i.e. the cooler the environment around the fiber, the faster the fiber will cool. In the ribbon process, this pre-existing heat is not a problem because the fibers are at room temperature going into the coating die. However, there is still the potential for creating variations in finished material properties, such as modulus, and the problem of wasted energy used to generate useless wavelengths of radiation, as discussed below.

UV curing relies on both the intensity and wavelength of the UV radiation, as well as on the corresponding absorption of the photoinitiators and photosensitizers in the UV-curable material. Conventional irradiators use a lamp that emits a wide variety of wavelengths with peak irradiations at one or more wavelengths or a small band of wavelengths. A certain level of inefficiency is inherent in such lamps simply because the majority of the output power is applied over a broad band of wavelengths that may not be helpful in the curing process. Additionally, such lamps typically require a high volume of air be pulled through the lamp configuration in order to keep it cool. This air is flowing in the area between the lamps bulb and the optical fiber or optical fiber ribbon, hereafter referred to as the substrate (i.e. substrate is either on optical fiber or an optical fiber ribbon). The oxygen in this air will react with a portion of the UV radiation emitted and form ozone, which must then be dealt with as a safety concern. The UV radiation that is consumed in this reaction with oxygen never reaches the substrate and is therefore lost as an inefficiency. A laser system, not generating the radiative heat of the conventional lamps, does not require this cooling airflow in the region between the laser and the substrate. Therefore, this region may be filled with an inert gas such as nitrogen so that there is no oxygen in this region to consume any UV radiation. With this in mind, not only does the laser not produce wasted radiation, but also it can be used in such a way as to deliver the radiation produce in a more efficient manner.

U.S. Pat. No. 4,812,150 discloses using a laser to cure coatings of an optical fiber. However, in this patent, a single laser beam impinges on one side of the optical fiber such that the heating of the coating is uneven. Curing an optical fiber, and especially an optical fiber ribbon, in this manner will cause the substrate to bow since the curing on one side is greater than the curing on the other side. Further, excess heat may be generated due to the localized focus of the laser beam resulting in a coating with an undesirable modulus. If a UV-curable laser is used in the arrangement described in this prior art (rather than the heat generating lasers described), there will be little or no heating due to the localization of the laser's output wavelength into a relatively narrow band. However, the potential for uneven cure, and thus bowing, is equally true with any wavelength laser if the laser is primarily focused on one side of the optical fiber or optical fiber ribbon.

SUMMARY OF THE INVENTION

It is an object of the present invention to overcome the drawbacks of the above related art. More particularly, it is an object of the present invention to provide a system and a method for curing a coating applied to an optical fiber substrate in which the temperature of the coating during curing is maintained in a preferred range.

It is a further object of the invention to provide a system and a method of curing a coating of an optical fiber substrate where the wavelength of the beams used to cure the coating is controlled to optimize polymerization efficiency and minimize wasted energy (i.e. energy used to create wavelengths that do not activate the photoinitiators/sensitizers and energy used to generate the UV-radiation that is absorbed by oxygen in conventional lamp systems).

The present invention achieves the above and other objects and advantages by providing a laser curing device which emits a plurality of laser beams, having a predetermined wavelength or wavelength range, that impinge on the fiber at differing angles to provide a uniform cure.

According to one aspect of the invention, the system includes at least one laser for outputting a laser beam; a splitter for splitting the laser beam into a plurality of output beams; and a reflector device for reflecting the output beams such that the output beams are irradiated on the coating of the optical fiber from different angles. The reflector device comprises a plurality of mirrors or, alternatively, a housing, which substantially surrounds the optical fiber where at least a portion of an inner surface of the housing is reflective.

The splitter includes a beam splitter or any other equivalent means for splitting a beam. The laser beam has a preferred wavelength in the range of 250–450 nm, however, the optimal wavelength will be dependent on the specific photoinitiators/sensitizers used in the material being cured. For instance, the shorter wavelengths are more energetic and will typically provide a faster cure rate, while the longer wavelengths tend to more adequately penetrate through contaminants, such as pigments, and are therefore generally more suitable for pigmented materials.

According to another aspect of the invention, the. system includes a second laser for outputting a second laser beam which impinges on the fiber substrate, where the wavelength range of the second laser is in range that may be different from the wavelength range of the first laser to cure at different depths, or may be the same to provide additional energy and thus reduce the required exposure time (increasing production speed).

According to yet another aspect of the invention, a method of curing the coating of an optical fiber substrate includes the step of directing a plurality of beams emitted by at least one laser toward the substrate such that the beams impinge on the substrate at different angles.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views and wherein.

DETAILED DESCRIPTION OF THE INVENTION

Figure 1A:
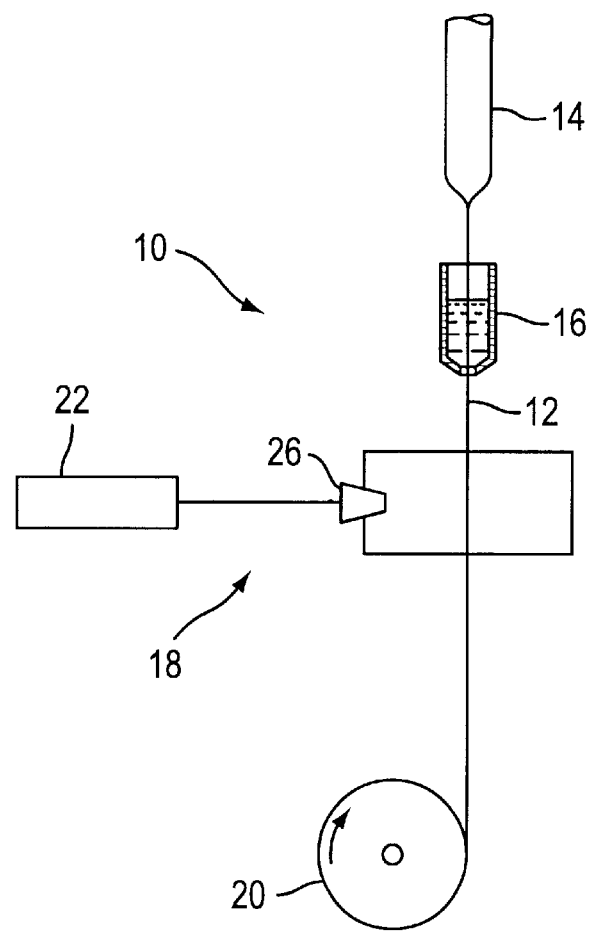
FIGS. 1(a) and (b) are a diagrammatic views showing an on-line coating system for an optical fiber and an optical fiber ribbon, respectively, according to the present invention.
Figure 1B:
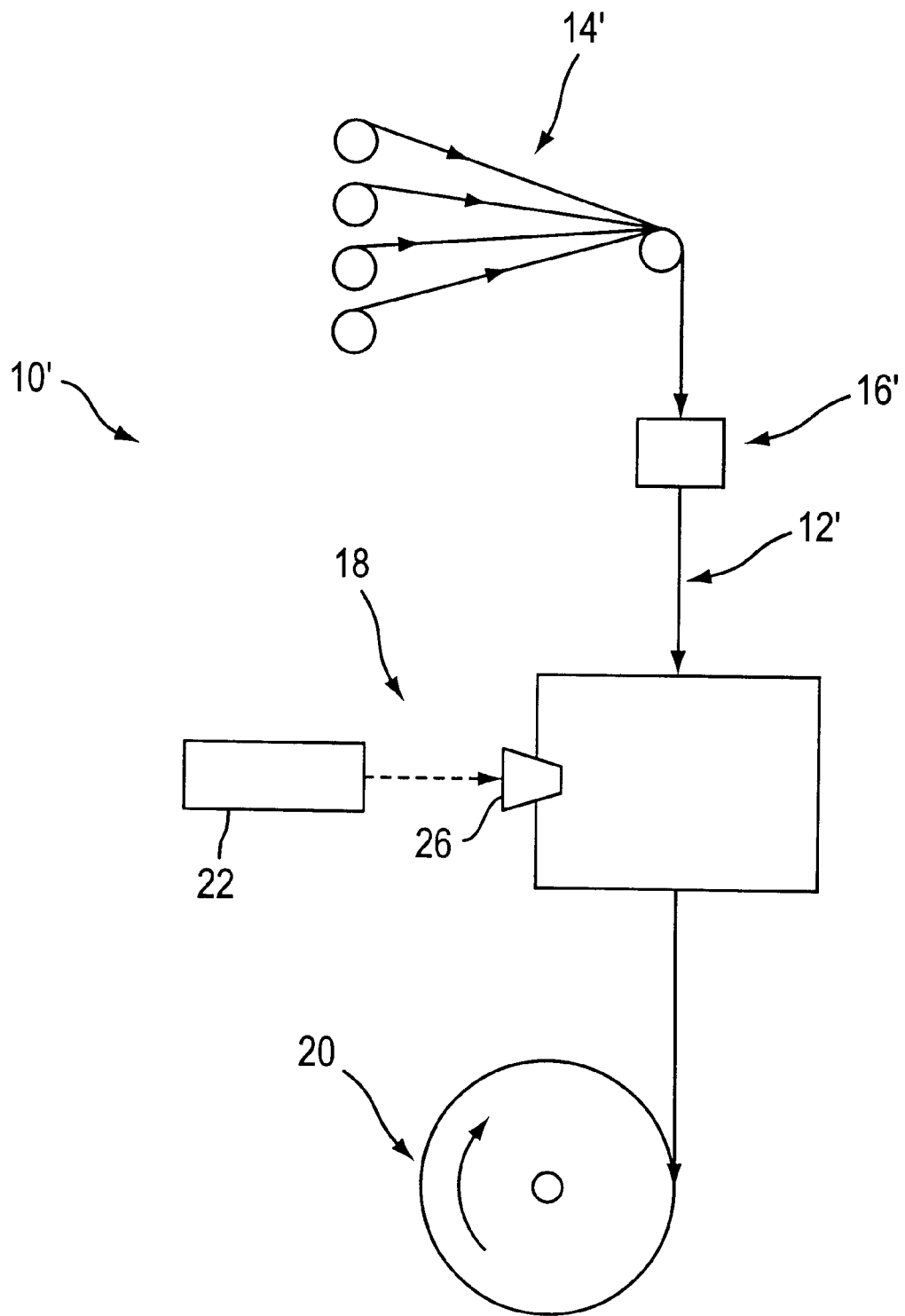

A first embodiment of the present invention will now be described with reference to FIG. 1. FIG. 1(a) shows a fiber draw system 10 in which a fiber 12 is drawn from a conventional preform 14 and passed through a coating apparatus 16 for applying a coating(s) to the fiber. Then, the coated optical fiber 12 is passed through a laser curing device 18 to cure the coating and, thereafter, to a take-up 20 where it is spooled. FIG. 1 (b) shows a ribbon production system 10' in which a plurality of optical fibers 14' are pulled though a coating apparatus 16' for applying a coating to all of the fibers simultaneously and thus producing the ribbon 12'. This ribbon 12' is then passed through the laser curing device 18 to cure the coating and thereafter to a take-up 20 where it is spooled. While these figures only show a single coating device and a single curing device, it is understood that the invention is not limited to applying and curing a single coating. For example, there could be two laser curing devices 18 respectively located downstream of a primary coating device and a secondary coating device.

Figure 2:
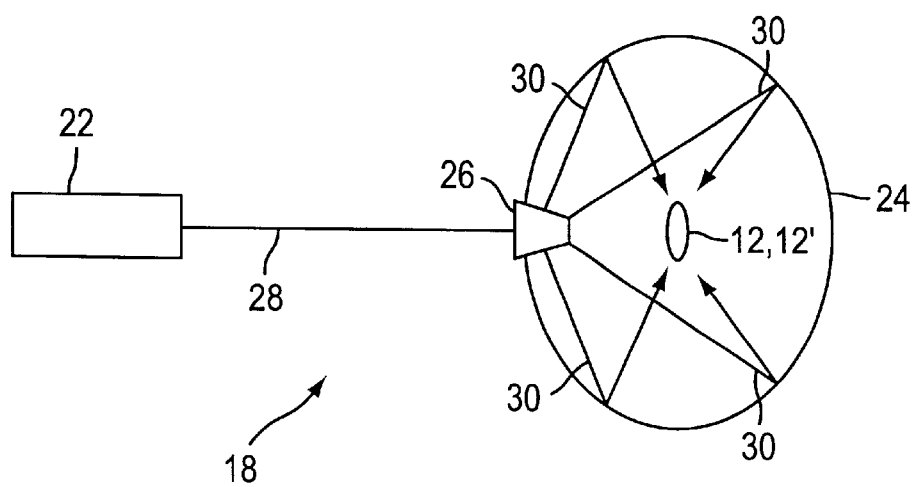
FIG. 2 is diagrammatic view showing the laser curing device according to a first embodiment of the present invention.

The laser curing device 18, according to a first embodiment of the invention, will now be described with reference to FIG. 2. The curing device 18 includes a laser 22, a curing housing 24 and a beam splitter 26. The curing housing 24 has a generally elliptical shape when used for curing of optical fiber ribbon coatings, with the inside surface of the housing having a reflective coating applied thereto. Alternatively, mirrors can be selectively located and angled within the housing.

According to the present invention, the coated optical fiber 12 or ribbon 12' passes through the housing 24. The laser 22 emits a laser beam 28 which is split by beam splitter 26 into a plurality of output beams 30 which are reflected by the reflective inner surface of the housing 24 (or mirrors) such that they impinge on the optical fiber 12 at various angles. Hence, the laser beams impinge on the optical fiber from multiple sides thereby providing a more uniform cure.

Further, by using a laser beam for curing, it is possible to irradiate the fiber at a precise wavelength or wavelength range that is effective in curing the coating while significantly reducing the infrared and other wasted wavelength output. Therefore, there the temperature of the coating can be more precisely controlled so that it does not rise to a temperature that will cause the problems discussed above regarding the stability and modulus of the coating. Additionally, the irradiation will require less energy to generate the desired intensity in the desired wavelength band since little or no energy is wasted on producing radiation in a wavelength band(s) that is of no benefit to the curing process. The low temperature of the laser system will also allow for the removal of the oxygen in the conventional cooling airflow in the curing exposure region, thus allowing a more efficient delivery to the substrate of the radiation produced.

A further advantage of the present invention is that the line speed can be increased, as compared to conventional curing using lamps. Specifically, since the beam output by the laser impinges on the fiber at multiple positions around the periphery of the fiber and with a preferred wavelength, the curing of the coating is quicker than conventional arrangements allowing the line speed to be increased.

Figure 3:
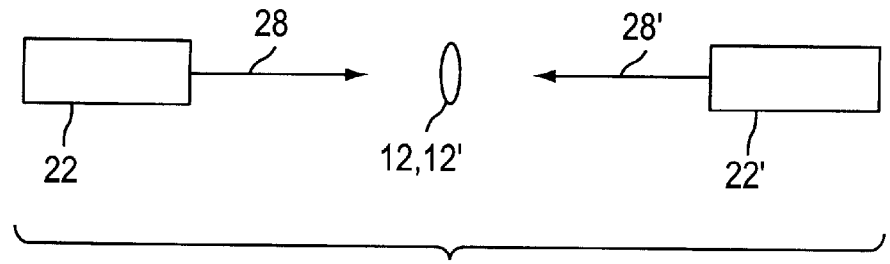
FIG. 3 is diagrammatic view showing the laser curing device according to a second embodiment of the present invention.

FIG. 3 illustrates a second embodiment of a laser curing device according to the present invention. According to this embodiment, the laser curing device 18 includes a pair of lasers 22, 22' that respectively emit a pair of laser beams 28, 28' onto the fiber 12 or ribbon 12' from opposite sides. While only two lasers are shown in this embodiment, it is of course understood that the invention is not limited in this respect, and that the invention is intended to cover a device where either a single laser with a beam splitter is used as in the first embodiment or two or more lasers are used as in this embodiment. Since two separate lasers 22, 22' are utilized in this embodiment, it is not necessary to include a beam splitter or beam reflectors, as in the first embodiment. However, these two embodiments could be combined to include multiple lasers and beam splitters to increase the number of output beams that impinge on the fiber.

Figure 4:
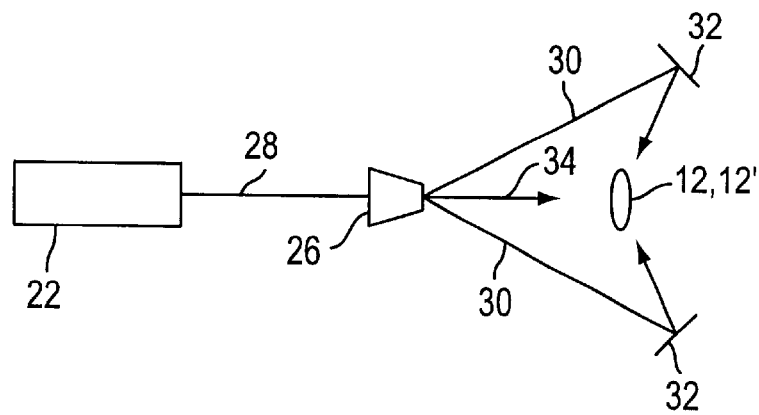
FIG. 4 is diagrammatic view showing the laser curing device according to a third embodiment of the present invention.

FIG. 4 illustrates a third embodiment of the present invention. In this embodiment, the laser curing device 18 includes mirrors instead of the elliptical curing housing 24 of the first embodiment. Hence, the laser curing device 18 includes a laser 22, a beam splitter 26 and a plurality of mirrors 32. The laser 22 emits a laser beam 28, which is split into a plurality of output beams 30. Two of the output beams 30 are reflected by the reflective surfaces of the mirrors 32 and thereafter impinge on back side of the optical fiber 12 or ribbon 12' (i.e., the side of the substrate opposite the laser that emits the beam). A third output beam 34 is directed straight toward the optical fiber or ribbon so that it impinges directly on the front side of the fiber or ribbon (i.e., the side of the substrate on which the laser that emits the beam is disposed).

Figure 5:
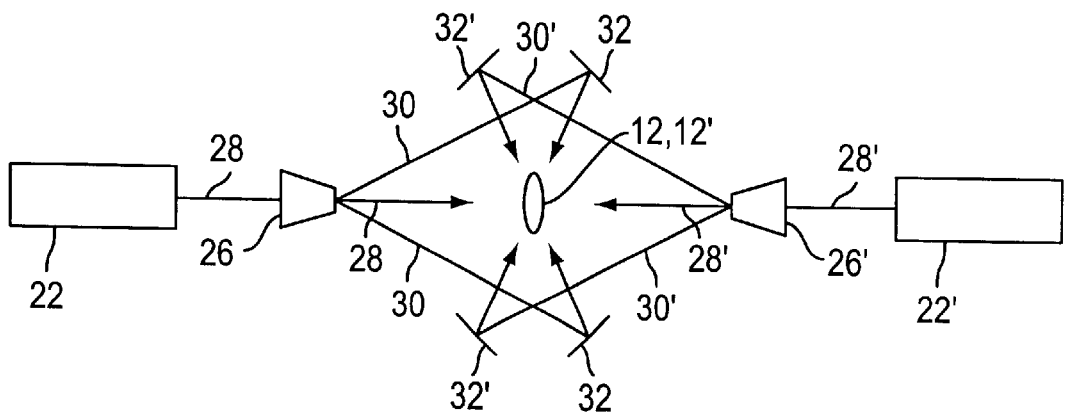
FIG. 5 is diagrammatic view showing the laser curing device according to a fourth embodiment of the present invention.

FIG. 5 illustrates yet another embodiment of the present invention, which represents a combination of the second, and third embodiments respectively illustrated in FIGS. 3 and 4. In particular, according to this embodiment of the present invention, the curing device includes two laser systems; each including a laser 22, 22', a beam splitter 26, 26' and a pair of mirrors 32, 32'. Each of the lasers 22, 22' emits a laser beam 28, 28' which is split by the beam splitter 26, 26' into a plurality of output beams. Two of the output beams 30, 30' are reflected by the reflective surfaces of the mirrors 32, 32' and thereafter impinge on back side of the optical fiber 12 (i.e., the side of the fiber opposite the laser that emits the beam). A third beam 34,34' is directed straight toward the optical fiber so that it impinges directly on the front side of the fiber (i.e., the side of the fiber on which the laser that emits the beam is disposed). The laser systems are shown symmetrically arranged with respect to the fiber 12 such that a total of six output beams, including four reflected beams 30 and two direct beams 34, impinge on the fiber from various, angles such that the coating is cured uniformly. It is also within the scope of the invention to include any number of beams and reflectors in order to more uniformly distribute the irradiation around the substrate 12 or 12'.

In some instances it is preferable to cure the coating using two different wavelengths or two different wavelength ranges. For example, when manufacturing optical fiber ribbons, it is sometimes desirable to expose the ribbon 12' to a relatively short wavelength irradiation to promote surface cure to lock-in the ribbon structure and then to complete the cure with a longer wavelength irradiation that will penetrate to greater depths within the polymerizing material—especially when the coating is pigmented. With this embodiment, the first laser 22 can be energized first and emit a relatively high wavelength irradiation to perform the surface cure and then the second laser 22' can be energized and emit a relatively short wavelength irradiation to complete the cure.

Although the invention is not limited to a particular wavelength range, according to the present invention the preferred range is between 250 nm and 450 nm. As noted above, it is sometimes desirable to cure the coating using different wavelengths. The preferred wavelength range is less than 350 nm for the initial cure and 350–450 nm for the final cure.

Figure 6:
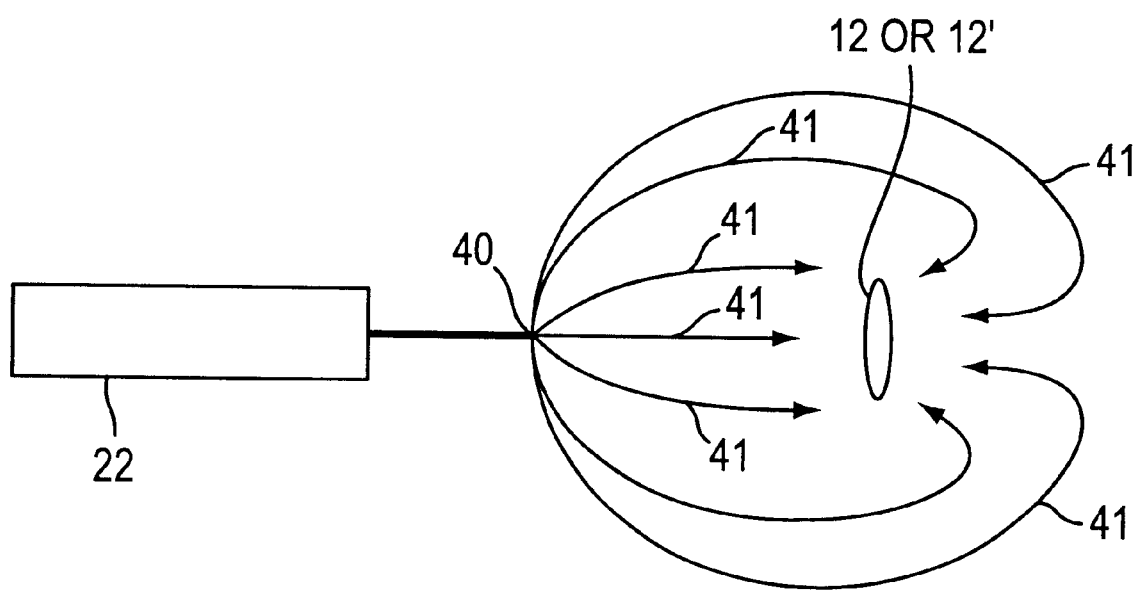
FIG. 6 is diagrammatic view showing the laser curing device according to a fifth embodiment of the present invention.

FIG. 6 illustrates another embodiment of the present invention. In this embodiment the reflectors and/or mirrors and the beam splitter are replaced with an UV-optical fiber bundle 40. The UV-optical fiber bundle 40 would need to be comprised of special UV-optical fibers 41 that are produced for use specifically in the low wavelengths in the UV spectrum. For instance, standard optical fibers used in telecommunications are designed for optimization of optical properties in much longer wavelengths near 1310 nm or 1550 nm, while the UV radiation used for polymerization of coatings is typically between 250 nm and 450 nm. The laser 22 would be positioned such that it is directing its beam into a bundle 40 of these fibers 41 that consists of one end of each of the fibers. The other end of each of the fibers 41 in this bundle would then be placed such that the beam portion that is emitted from the end of the fiber is directed towards the substrate 12 or 12' from a specific direction and angle. The laser would then be divided into each of these UV-optical fibers 41 and directed through these fibers to the substrate 12 or 12'.

While the present invention has been described with respect to what is presently considered to be the preferred embodiments, the present invention is not limited to the disclosed embodiments. Rather the present invention covers various modifications and equivalent arrangements included within the spirit and scope of the appended claims. The scope of the appended claims is to be afforded the broadest interpretation so as to encompass all such modifications and equivalent structures and functions.

I claim:

1. A system for curing a coating applied to an optical fiber or optical fiber ribbon, comprising:
    a laser for outputting a laser beam;
    a splitter for splitting said laser beam into a plurality of output beams; and
    a reflector device for reflecting said output beams such that said output beams are irradiated on said coating of said optical fiber or optical fiber ribbon from different angles.

2. The system of claim 1, wherein said reflector device comprises a plurality of mirrors.

3. The system of claim 1, wherein said reflector device comprises a housing which substantially surrounds said optical fiber, at least a portion of an inner surface of said housing being reflective to the wavelength emitted by the laser.

4. The system of claim 1, wherein said splitter comprises a beam splitter.

5. The system of claim 4, wherein said laser beam has a wavelength in one of a first range of 250–350 nm and a second range of 350–450 nm.

6. The system of claim 5, further comprising a second laser for outputting a second laser beam which impinges on said fiber or ribbon.

7. The system of claim 6, wherein the wavelength range of said second laser is in the other of the first range and the second range.

8. The system of claim 6, further comprising a second beam splitter for splitting said second laser beam into a plurality of second output beams and a second reflector device for reflecting said second output beams such that said second output beams are irradiated on said coating of said optical fiber or ribbon from different angles.

9. The system of claim 8, wherein said second reflector device comprises a plurality of mirrors.

10. A system for curing a coating applied to an optical fiber or ribbon, comprising:
    a plurality of lasers for respectively outputting a plurality of laser output beams, said output beams being irradiated on said coating of said optical fiber or ribbon from different angles.

11. The system of claim 10, further comprising at least one reflector for reflecting said output beams to control said different angles.

12. The system of claim 10, wherein said output beams have a wavelength in the range of 250–450 nm.

13. The system of claim 10, wherein said output beam of a first of said lasers has a wavelength in a first range of 250–350 nm and said output beam of a second of said lasers has a wavelength in a second range of 350–450 nm.

14. The system of claim 10, wherein said output beam of a first of said lasers has a wavelength that is different from the wavelength of said output beam of a second of said lasers.

15. A system for curing a coating applied to an optical fiber or ribbon, comprising:

a laser for outputting a laser beam, said laser beam being split into a plurality of output beams which impinge on said fiber or ribbon from different angles.

16. A system for curing a coating applied to an optical fiber or optical fiber ribbon substrate, comprising:

a laser for outputting a laser beam; and a bundle of UV-optical fibers for directing the lasers UV-radiation towards said optical fiber or said optical fiber ribbon from a plurality of different directions.

* * * * *